US012067782B2

(12) United States Patent
Son et al.

(10) Patent No.: US 12,067,782 B2
(45) Date of Patent: Aug. 20, 2024

(54) SURVEILLANCE CAMERA SYSTEM AND METHOD FOR OPERATING SAME

(71) Applicant: HANWHA TECHWIN CO., LTD., Seongnam-si (KR)

(72) Inventors: Myung-hwa Son, Seongnam-si (KR); Changseup Kim, Seongnam-si (KR); Minsuk Sung, Seongnam-si (KR)

(73) Assignee: Hanwha Vision Co., Ltd., Seongnam-si (KR)

( * ) Notice: Subject to any disclaimer, the term of this patent is extended or adjusted under 35 U.S.C. 154(b) by 0 days.

(21) Appl. No.: 17/766,541

(22) PCT Filed: Dec. 16, 2019

(86) PCT No.: PCT/KR2019/017772
§ 371 (c)(1),
(2) Date: Apr. 5, 2022

(87) PCT Pub. No.: WO2021/071025
PCT Pub. Date: Apr. 15, 2021

(65) Prior Publication Data
US 2024/0054787 A1 Feb. 15, 2024

(30) Foreign Application Priority Data
Oct. 10, 2019 (KR) .................. 10-2019-0125339

(51) Int. Cl.
*G06V 20/52* (2022.01)
*G06V 20/40* (2022.01)
(Continued)

(52) U.S. Cl.
CPC ............ *G06V 20/52* (2022.01); *G06V 20/44* (2022.01); *G08B 13/19645* (2013.01);
(Continued)

(58) Field of Classification Search
None
See application file for complete search history.

(56) References Cited

U.S. PATENT DOCUMENTS

| 2016/0156845 | A1* | 6/2016 | Lee ..................... H04N 23/651 |
| | | | 348/372 |
| 2019/0104283 | A1* | 4/2019 | Wakeyama ...... G08B 13/19658 |
| 2020/0033857 | A1* | 1/2020 | Yu .......................... H04W 4/38 |

FOREIGN PATENT DOCUMENTS

| CN | 106937077 A | * | 7/2017 | |
| CN | 105915847 B | * | 8/2019 | ......... G06K 9/00724 |

(Continued)

OTHER PUBLICATIONS

English translation of KR-20160072617-A, Shim, Jun. 2016 (Year: 2016).*
(Continued)

*Primary Examiner* — James M Hannett
(74) *Attorney, Agent, or Firm* — McLean IP Global; Jason Y. Pahng (57) ABSTRACT

A surveillance camera system according to an embodiment of the present disclosure comprises: multiple surveillance cameras for capturing images of different surveillance regions to surveil a protection object; an event management server which is connected to the surveillance cameras through a communication network and receives a first event signal or a second event signal from at least one of the surveillance cameras; and a manager terminal for receiving event information corresponding to the second event signal from the event management server when the second event signal is generated, wherein the first event signal corresponds to a signal generated when the protection object is detected by at least one of the multiple surveillance cameras, and the second event signal corresponds to a signal generated when the protection object is detected by none of the (Continued)

multiple surveillance cameras during a preconfigured reference time.

20 Claims, 5 Drawing Sheets

(51) Int. Cl.
  *G08B 13/196* (2006.01)
  *H04N 23/611* (2023.01)
(52) U.S. Cl.
  CPC .... *G08B 13/19654* (2013.01); *G06V 2201/07* (2022.01); *H04N 23/611* (2023.01)

(56) References Cited

FOREIGN PATENT DOCUMENTS

| | | | |
|---|---|---|---|
| JP | 2006115080 A | * | 4/2006 |
| JP | 6273944 B2 | | 10/2015 |
| KR | 10-2010-00444970 | | 5/2010 |
| KR | 10-1020-0085337 | | 7/2010 |
| KR | 10-1038370 | | 6/2011 |
| KR | 101038370 B1 | * | 6/2011 |
| KR | 10-2012-0105205 A | | 9/2012 |
| KR | 10-2012-0140518 A | | 12/2012 |
| KR | 10-2014-0121713 A | | 10/2014 |
| KR | 10-2016-0007039 A | | 1/2016 |
| KR | 10-2016-0072617 | | 6/2016 |
| KR | 20160072617 A | * | 6/2016 |
| KR | 20180072466 A | * | 6/2018 |

OTHER PUBLICATIONS

English translation of KR-101038370-B1, Kim et al., Jun. 2011 (Year: 2011).*
English translation of KR-20180072466-A, Kim et al., Jun. 2018 (Year: 2018).*
English translation of JP-2006115080-A, Hanaoka, Apr. 2006 (Year: 2006).*
English translation of CN-105915847-B, Bao. Aug. 2018 (Year: 2018).*
English translation of CN-106937077-A, Li, Jul. 2017 (Year: 2017).*
International Preliminary Report on Patentability for International application No. PCT/KR2019/017772 issued on Apr. 12, 2022.
International Search Report for International application No. PCT/KR2019/017772 issued on Jul. 6, 2020.

* cited by examiner

SURVEILLANCE CAMERA SYSTEM AND METHOD FOR OPERATING SAME

This application is a national stage application, filed under 35 U.S.C § 371, of international patent application number PCT/KR2019/017772, filed on Dec. 16, 2019, which is hereby incorporated by reference in its entirety. In addition, this application claims priority from Korean application number 10-2019-0125339, filed on Oct. 10, 2019, which is hereby incorporated by reference in its entirety.

BACKGROUND OF THE DISCLOSURE

Field of the Disclosure

An embodiment of the present disclosure relates to a surveillance camera system, and more particularly, to a surveillance camera system capable of recognizing a common event through a plurality of surveillance cameras and a method for controlling the surveillance camera system.

Related Art

Recently, it is common to install a surveillance camera system on the inside or outside of a building or on a street for various purposes such as crime prevention, security, and store management. The surveillance camera system can perform a function as a network camera by connecting a plurality of cameras to each other through a wired or wireless network.

As the use of the surveillance camera system is generalized, a use of a surveillance camera surveillance system is also generalized, and thus, a user can easily monitor the images captured by the network cameras through his or her mobile terminal. Accordingly, the surveillance camera system is widely used when subjects who need management and protection, that is, elderly people with reduced mobility or young children, reside in a specific place.

However, even when a plurality of cameras are installed, it is difficult to cover all regions of the installation place, and thus, there is a problem that there is a blind spot in the camera surveillance region. Therefore, in the case of the conventional surveillance camera system, there is a disadvantage that the problem of the protection target generated in the blind spot of the surveillance region cannot be detected quickly.

SUMMARY

In a surveillance camera system in which at least two or more cameras operate in cooperation with each other, an embodiment of the present disclosure provides a surveillance camera system and a method for operating the same capable of recognizing a case where each of the two or more cameras does not detect an object to be monitored during the preconfigured reference time as a specific event and transmitting event information to an external user (manager) terminal to prevent accidents that may occur in a blind spot of the surveillance region in advance.

In order to achieve the object, according to an embodiment of the present disclosure, there is provided a surveillance camera system including: a plurality of surveillance cameras configured to capture images of different surveillance regions to monitor a protection object; an event management server connected to the surveillance cameras through a communication network to receive a first event signal or a second event signal from at least one of the surveillance cameras; and a manager terminal configured to receive event information corresponding to the second event signal from the event management server when the second event signal is generated, in which the first event signal is a signal generated when the protection object is detected by at least one surveillance camera of the plurality of surveillance cameras and the second event signal is a signal generated when the protection object is not detected by all of the plurality of surveillance cameras during a preconfigured reference time.

The plurality of surveillance cameras may include a first camera to a fourth camera configured to monitor the different surveillance regions, and when the protection object is detected in the first surveillance region of the first camera, the first camera may transmit the detection result to other cameras to share the detection result.

The detection result of the first camera may be information corresponding to the first event signal, and the first camera which detects the protection object may generate the first event signal to transmit the first event signal to the event management server.

The event management server may store information corresponding to the first event signal by itself and not transmit the stored information to the manager terminal.

The information corresponding to the first event signal may include an image signal capturing the image of the protection object, an audio signal recorded when an image is captured by the first camera, and a location signal of a photographed place.

When the protection object is not detected by all of the plurality of surveillance cameras during the preconfigured reference time, the second event signal may be generated by at least one surveillance camera of the plurality of surveillance cameras.

At least one surveillance camera generating the second event signal may transmit the second event signal to the event management server.

The event management server may transmit information corresponding to the second event signal to the manager terminal.

The information corresponding to the second event signal may include an audio signal recorded during a period in which the protection object is not detected and a location signal of a place corresponding to the second event signal.

The manager terminal receiving event information corresponding to the second event signal may generate and output a predetermined warning signal.

According to another embodiment of the present disclosure, there is provided a method for operating a surveillance camera system to capture images of different surveillance regions through a plurality of surveillance cameras and monitor a protection object, the method including: determining whether the protection object is detected by at least one surveillance camera of the plurality of surveillance cameras; performing a first event mode in which a first event signal is generated when the protection object is detected by the at least one surveillance camera; and performing a second event mode in which a second event signal is generated when the protection object is not detected from all of the plurality of surveillance cameras during a preconfigured reference time.

The plurality of surveillance cameras may include a first camera to a fourth camera configured to monitor the different surveillance regions, and the method may further include generating, when the protection object is detected in a first surveillance region of the first camera, a first event signal corresponding to the detection result by the first camera and transmitting the first event signal to other cameras to share.

The method may further include: transmitting the first event signal to an event management server; and storing information corresponding to the first event signal by the event management server, in which the stored information may not be transmitted to the manager terminal.

The information corresponding to the first event signal may include an image signal capturing the image of the protection object, an audio signal recorded when an image is captured by the first camera, and a location signal of a photographed place.

The method may further include: generating the second event signal by at least one surveillance camera of the plurality of surveillance cameras when the protection object is not detected by all of the plurality of surveillance cameras during the preconfigured reference time; and transmitting the second event signal to an event management server by at least one surveillance camera generating the second event signal.

The method may further include transmitting information corresponding to the second event signal to a manager terminal by the event management server.

The information corresponding to the second event signal may include an audio signal recorded during a period in which the protection object is not detected and a location signal of a place corresponding to the second event signal.

The method may further include generating and outputting a predetermined warning signal by the manager terminal receiving the event information corresponding to the second event signal.

Advantageous Effects

According to an embodiment of the present disclosure, in a surveillance camera system in which at least two or more cameras operate in cooperation with each other, it is possible to recognize a case where each of the two or more cameras does not detect all objects to be monitor during the preconfigured reference time as a specific event and transmit event information to an external user terminal to prevent accidents that may occur in a blind spot of the surveillance region in advance.

DESCRIPTION OF EXEMPLARY EMBODIMENTS

The contents described in the technical field of the background of the present disclosure are only for helping the understanding of the background of the technical idea of the present disclosure, and therefore, the contents cannot be understood as the content corresponding to the prior art known to those skilled in the art of the present disclosure.

In the following description, for purposes of explanation, numerous specific details are set forth to aid in understanding various embodiments. It will be evident, however, that various embodiments may be practiced without these specific details or in one or more equivalent manners. In other instances, well-known structures and devices are illustrated in block diagram form in order to avoid unnecessarily obscuring the various embodiments.

Each block of the accompanying block diagram may be executed by computer program instructions (execution engine), and the computer program instructions may be mounted in the processor of a general-purpose computer, special purpose computer or other programmable data processing equipment. Accordingly, the instructions, which are executed by the processor of a computer or other programmable data processing equipment, create means for performing the functions described in each block of the block diagram.

These computer program instructions may also be stored in a computer usable or computer readable memory that may direct a computer or other programmable data processing equipment to implement a function in a particular manner, and thus it is also possible that the instructions stored in the computer usable or computer readable memory produce an article of manufacture containing instruction means for performing the functions described in each block of the block diagram.

Moreover, since the computer program instructions may be mounted on a computer or other programmable data processing equipment, a series of operating steps are performed on the computer or other programmable data processing equipment to create a computer-executed process, and it is also possible that instructions for creating a computer-executed process to perform the computer or other programmable data processing equipment provide functions for executing the functions described in each block of the block diagram.

In addition, each block may represent a module, segment, or portion of code that includes one or more executable instructions for executing specified logical functions, and in some alternative embodiments, it is also possible for the functions recited in blocks or steps to occur out of order.

That is, two illustrated blocks may be substantially simultaneously performed, and the blocks may also be performed in the reverse order of their corresponding functions, if necessary.

Terminology used herein is for the purpose of describing particular embodiments and not for the purpose of limitation. Throughout the specification, when a part "includes" a certain element, it means that other elements may be further included, rather than excluding other elements, unless otherwise stated. Unless otherwise specified, terms used herein have the same meanings as commonly understood by those of ordinary skill in the art to which the present disclosure belongs.

An image according to embodiments of the present disclosure includes both a still image and a moving image unless otherwise limited.

Hereinafter, embodiments of the present disclosure will be described in more detail with reference to the accompanying drawings.

Figure 1:
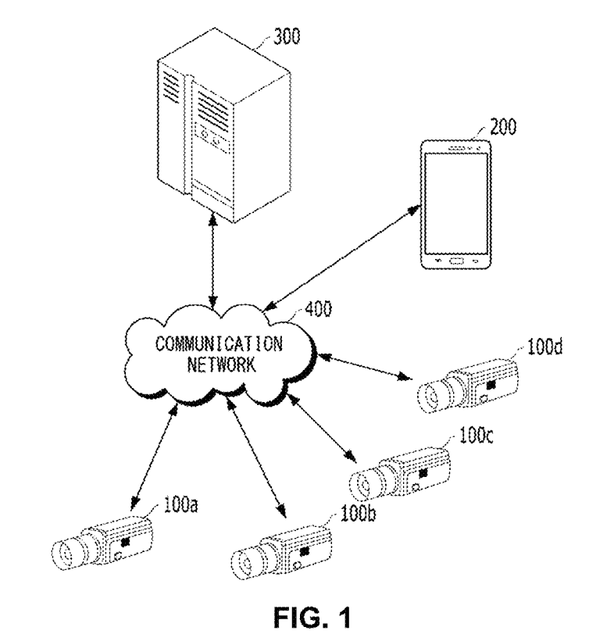
FIG. 1 is a block diagram schematically illustrating a configuration of a surveillance camera system according to an embodiment of the present disclosure.

FIG. 1 is a block diagram schematically illustrating the configuration of a surveillance camera system according to an embodiment of the present disclosure.

Referring to FIG. 1, a surveillance camera system according to an embodiment of the present disclosure may include a plurality of surveillance cameras 100. The plurality of surveillance cameras 100 may include a first camera 100a, a second camera 100b, a third camera 100c, and a fourth camera 100d. Although the four cameras 100a, 100b, 100c, and 100d are illustrated in FIG. 1, the present disclosure is not limited thereto, and the surveillance camera system may include at least two or more surveillance cameras 100.

In addition, the surveillance camera system may include a communication network 400 interconnecting the first to fourth cameras 100a, 100b, 100c, and 100d, and include an event management server 300 which is connected to the first to fourth cameras through the communication network 400 and receives a predetermined event signal from the at least one surveillance camera.

In addition, the surveillance camera system may include a manager terminal 200 for receiving information corresponding to a specific event signal through the event management server 300 when the event signal is transmitted from at least one surveillance camera of the first to fourth cameras 100.

The first to fourth cameras 100a, 100b, 100c, and 100d may be a surveillance camera of the surveillance camera system according to an embodiment of the present disclosure. As an example, the first to fourth cameras 100a, 100b, 100c, and 100d may be surveillance cameras disposed at a fixed location of a specific place to monitor a specific region of the specific place.

Figure 2:
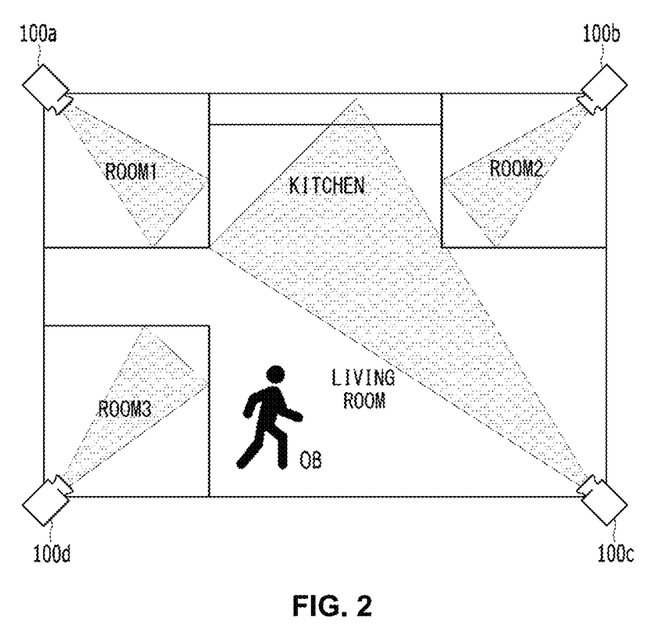
FIG. 2 is a diagram schematically explaining an application example of the surveillance camera system illustrated in FIG. 1.

FIG. 2 is a diagram schematically illustrating an application example of the surveillance camera system illustrated in FIG. 1. Referring to FIG. 2, for example, the specific place monitored by the surveillance cameras may be a space inside a house in which a protection object OB (for example, elderly people with reduced mobility, small children, or the like) to be monitored resides.

In this case, the first camera 100a function as a camera that is installed in a room 1 to monitor a space of the room 1, the second camera 100b functions as a camera that is installed in a room 2 to monitor a space of the room 2, the third camera 100c functions as a camera that is installed in a living room to monitor a space of the living room, and the fourth camera 100d functions as a camera this is installed in a room 3 to monitor a space of the room 3.

In addition, each of the first to fourth cameras 100a, 100b, 100c, and 100d may be a PTZ camera having pan, tilt, and zoom functions. In addition, each of the first to fourth cameras 100a, 100b, 100c, and 100d may have a function of recording a monitored region or taking a picture and/or a function of recording a sound generated in the monitored region.

Hereinafter, a region monitored by each of the surveillance cameras may be referred to as a surveillance region. Specifically, the regions monitored by each of the first to fourth cameras 100a, 100b, 100c, and 100d may be referred to as a first surveillance region, a second surveillance region, a third surveillance region, and a fourth surveillance region, respectively.

The event management server 300 may perform an operation of receiving a predetermined event signal from at least one of the first to fourth cameras 100a, 100b, 100c, and 100d. In an embodiment of the present disclosure, the event signal may include a first event signal generated when the protection object OB is detected from at least one of the first to fourth cameras 100a, 100b, 100c, and 100d and a second event signal generated when the protection object OB is not detected by all the cameras during the preconfigured reference time.

In addition, the event management server 300 may perform an operation as a server for storing collected data (for example, monitoring data) with at least one of the first to fourth cameras 100a, 100b, 100c, and 100d.

In FIG. 1, the first to fourth cameras 100a, 100b, 100c, and 100d are illustrated as connected to each other through the communication network 400 to transmit and receive the monitoring data, but the transmission and reception of the monitoring data between the first to fourth cameras 100a, 100b, 100c, and 100d may be performed through the event management server 300

That is, for example, data transmitted as an electronic signal from the first camera 100a may be transmitted to the server 300 through the communication network 400, and thereafter, the corresponding data may be transmitted from the server 300 to the second camera 100b through the communication network 400. The data collected through the first camera 100a or the second camera 100b may be stored in a memory built into the surveillance camera that has captured the data. However, this operation is one embodiment, and the embodiment of the present disclosure is not limited thereto.

The communication network 400 serves to connect the first to fourth cameras 100a, 100b, 100c, and 100d. In addition, the communication network 400 may serve to connect the first to fourth cameras 100a, 100b, 100c, and 100d with the event management server 300. That is, the communication network 400 refers to a communication network that provides a connection path to transmit and receive data between the first to fourth cameras 100a, 100b, 100c, and 100d.

For example, the communication network 400 may include a wired network such as LANs (Local Area Networks), WANs (Wide Area Networks), MANs (Metropolitan Area Networks), ISDNs (Integrated Service Digital Networks), or a wireless network such as wireless LANs, CDMA, Bluetooth, and satellite communication. However, the scope of the present disclosure is not limited thereto.

The manager terminal 200 includes a mobile terminal that can be carried by a manager as a protector of the protection object OB to be monitored. For example, the manager terminal 200 may be a smartphone, tablet, laptop, or the like. The manager terminal 200 may receive information corresponding to a specific event signal through the event management server 300 when an event signal is transmitted from at least one surveillance camera of the first to fourth cameras 100.

In the manager terminal 200, a surveillance application provided by the event management server 300 may be installed, event information generated by the surveillance system according to the embodiment of the present disclosure is received through the surveillance application, and thus, it is possible to prevent accidents that are generated in a blind spot of the surveillance region in advance. When the surveillance application is not installed in the manager terminal 200, the user may download the application from the event management server 300 and install the application in the terminal of the user.

Figure 3:
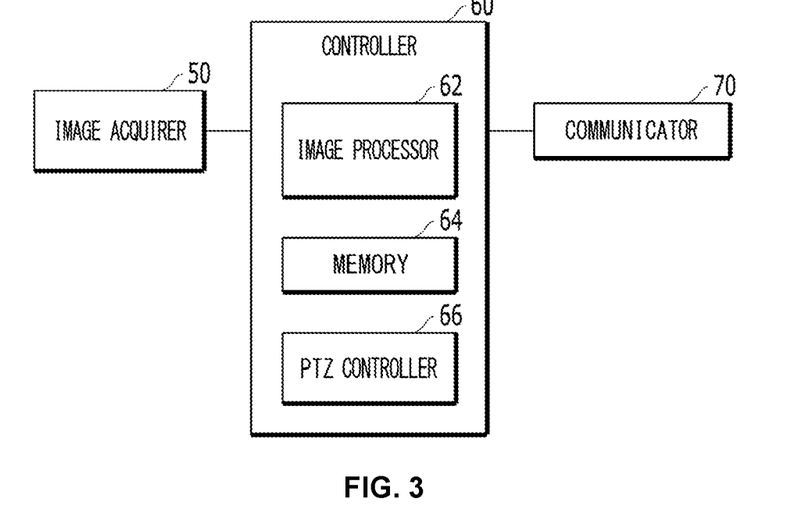
FIG. 3 is a block diagram schematically illustrating an internal configuration of the surveillance camera illustrated in FIG. 1.

FIG. 3 is a block diagram schematically illustrating an internal configuration of the surveillance camera illustrated in FIG. 1.

Referring to FIG. 3, each surveillance camera 100 includes an image acquirer 50, a controller 60, and a communicator 70. The surveillance camera may be one of the first to fourth cameras 100a, 100b, 100c, and 100d illustrated in FIG. 1.

The image acquirer 50 acquires a real-time image signal from an imaging device such as one or more fixed cameras. The image acquirer 50 may include an image sensor such as a charge coupled device (CCD) or a complementary metal oxide semiconductor (CMOS), and a lens that transmits light to the image sensor.

The controller 60 controls the overall operation of the surveillance camera, and may include an image processor 62, a memory 64, and a PTZ controller 66.

The image processor 62 generates a surveillance image by processing an image signal input in real time. The surveillance image is an image obtained by capturing the image of the surveillance region using the corresponding camera and may include predetermined thumbnail image information corresponding to the corresponding surveillance region and event-captured image information generated in the surveillance region.

The memory 64 may serve to store and manage the image information generated by the image processor 62, camera-specific information (for example, camera ID), and camera location information.

The PTZ controller 66 may serve to change PTZ coordinates of the camera according to set preset information. The preset information can be set by, for example, the manager through the server 30, and the manager can control position, direction, zoom degree, or the like of the camera by changing the PTZ coordinates using the preset information of the camera.

The controller 60 may be implemented as a processor, and the processor may be configured to process instructions of a computer program by performing basic arithmetic, logic, and input/output operations. The command may be provided to the processor, that is, the controller 60 by the memory 64. For example, the controller 60 may be configured to execute a received command according to a program code stored in a recording device such as the memory 64.

Here, the controller 60 may be implemented to execute an instruction according to an operating system code and at least one program code included in the memory 64. In this case, the components in the controller 60, that is, the image processor 62 and the PTZ controller 66 may be understood to distinguish and express different functions performed by the controller 60 according to a control command provided by the program code stored in the memory 64.

The communicator 70 includes a communication module and an antenna, and is connected to the controller 60 to transmit information such as an image of the image processor 62 to the server 300 or other cameras.

For example, when the camera is the first camera 100a illustrated in FIG. 1 and the protection object OB is detected in the surveillance region of the first camera, the detected result may be transmitted (for example, broadcast) to other cameras, that is, the second to fourth cameras 100b, 100c, and 100d, through the communicator 70.

Similarly, when the protection object OB is not detected in the surveillance region of the first camera, the result that the protection object OB is not detected is transmitted (broadcast) to the communicator 70 to other cameras, that is, the second to fourth cameras 100b, 100c, and 100d. Accordingly, each of the cameras can share in real time whether the protection object is detected in the surveillance regions of the other cameras, this shared information is transmitted to the event management server 300 as the first event signal or the second event signal described above, and thus, the event management server 300 may also check in real time whether the protection object is detected by the first to fourth cameras 100a, 100b, 100c, and 100d.

Figure 4:
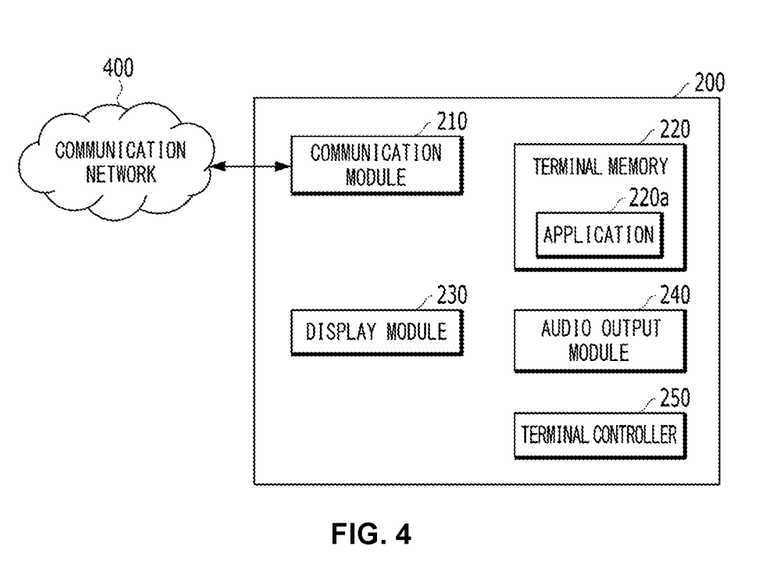
FIG. 4 is a block diagram schematically illustrating an internal configuration of a manager terminal illustrated in FIG. 1.

FIG. 4 is a block diagram schematically illustrating an internal configuration of the manager terminal illustrated in FIG. 1.

Referring to FIG. 4, the manager terminal 200 may include a communication module 210, a terminal memory 220, a display module 230, an audio output module 240, and a terminal controller 250.

The communication module 210 may communicate with any internal component or at least one external device through the communication network 400. In this case, any external device may include the event management server 300 illustrated in FIG. 1 as an example. Here, as wireless Internet technologies, there are wireless LAN (WLAN), Digital Living Network Alliance (DLNA), Wireless Broadband (Wibro), World Interoperability for Microwave Access (Wimax), High Speed Downlink Packet Access (HSDPA), High Speed Uplink Packet Access (HSUPA), IEEE 802.16, Long Term Evolution (LTE), Long Term Evolution-Advanced (LTE-A), Wireless Mobile Broadband Service (WMBS), or the like, and the communication module 210 transmits and receives data according to at least one wireless Internet technology within a range including Internet technologies not listed above.

In addition, short-range communication technologies may include Bluetooth, Radio Frequency Identification (RFID), Infrared Data Association (IrDA), Ultra Wideband (UWB), ZigBee, Near Field Communication (NFC), Ultra Sound Communication (USC), Visible Light Communication (VLC), Wi-Fi, Wi-Fi Direct, or the like.

The terminal memory 220 stores various user interfaces (UIs), graphic user interfaces (GUIs), and the like. In addition, the terminal memory 220 stores data and programs necessary for the manager terminal 200 to operate. That is, the terminal memory 220 may store a plurality of application programs (hereinafter, "applications") driven in the manager terminal 200, data for operation of the manager terminal 200, and commands. That is, at least one or more applications are stored in the terminal memory 220 of the manager terminal 200 according to the embodiment of the present disclosure. At least some of these applications may be downloaded from an external server through wireless communication. The embodiment of the present disclosure includes a surveillance application 220a provided by the event management server 300 illustrated in FIG. 1. Meanwhile, the applications may be stored in the terminal memory 220, installed in the manager terminal 200, and driven to perform an operation (or function) of the manager terminal 200 by the terminal controller 250.

In addition, the terminal memory 220 may include at least one storage medium of a flash memory type memory, a hard disk type memory, a multimedia card micro type memory, a card type memory (for example, SD or XD memory, or the like), a magnetic memory, a magnetic disk, an optical disk, a Random Access Memory (RAM), a Static Random Access Memory (SRAM), a Read-Only Memory (ROM), an Electrically Erasable Programmable Read-Only Memory (EEPROM), and a Programmable Read-Only Memory (PROM).

The display module 113 may display various contents such as various menu screens by using a user interface and/or a graphic user interface stored in the terminal memory 220 under the control of the terminal controller 250, and display an execution result screen of the surveillance application 220a executed by the control of the terminal controller 250, that is, information corresponding to the event generated in the protection object. For example, when the protection object is not detected by all the surveillance cameras during the preconfigured reference time, the surveillance application 220a may generate and output a predetermined warning signal through the display module 230 and/or the audio output module 240 of the manager terminal 200.

Here, the content displayed on the display module 113 may include various text or image data (including various information data), an icon, a menu screen indicating a list menu, and the like. The display module 113 may include a liquid crystal display (LCD), an organic light-emitting diode (OLED), a flexible display (Flexible Display), a three-dimensional display (3D Display), an electronic ink display (e-ink display), a Light Emitting Diode (LED), and the like. Moreover, the audio output module 240 may output voice information included in a signal processed by a predetermined signal under the control of the terminal controller 250. Here, the audio output module 240 may include a receiver, a speaker, and the like.

Figure 5:
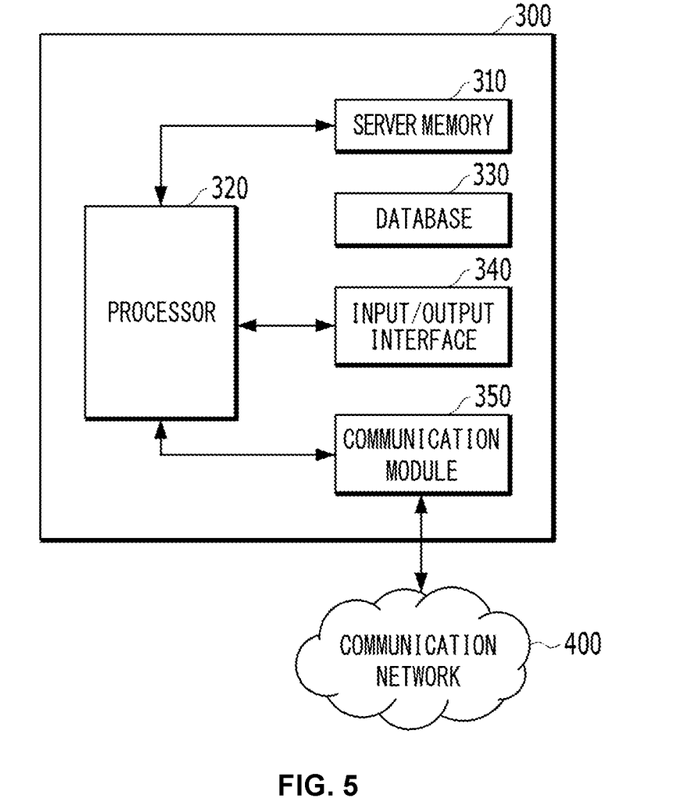
FIG. 5 is a block diagram schematically illustrating an internal configuration of an event management server illustrated in FIG. 1.

FIG. 5 is a block diagram schematically illustrating an internal configuration of the event management server illustrated in FIG. 1.

Referring to FIG. 5, the event management server 300 includes a server memory 310, a database 330, a processor 320, a communication module 350, and an input/output interface 340.

The server memory 310 is a computer-readable recording medium and may include a non-volatile mass storage device such as a RAM, a ROM, and a disk drive. The server memory 310 may store image information or the like corresponding to event signals generated from the first to fourth cameras 100a, 100b, 100c, and 100d illustrated in FIG. 1.

The processor 320 may be configured to process instructions of a computer program by performing basic arithmetic, logic, and input/output operations. The command may be provided to the processor 320 by the server memory 310 or the communication module 350. For example, the processor 320 may be configured to execute a received command according to a program code stored in a recording device such as the memory 320. That is, the processor 320 may include a program module that is implemented by software such as C, C++, Java, Visual Basic, Visual C, and the like and performs various functions.

The communication module 350 may provide a function to communicate with the first to fourth cameras 100a, 100b, 100c, and 100d through the communication network 400. As an example, the control signals, commands, and the like provided under the control of the processor 320 of the management server 300 may be transmitted via the communication network 400 through the communication module 350 to the first to fourth cameras 100a, 100b, 100c, and 100d, and similarly, the event signal, captured image information, and/or location information generated by the first to fourth cameras 100a, 100b, 100c, and 100d may be transmitted to the event management server 300 via the communication network 400.

The input/output interface 340 may serve to provide an interface between an input device implemented as a keyboard or mouse and an output device such as a display.

An operation of the surveillance camera system including the event management server 300 according to an embodiment of the present disclosure will be described in more detail below with reference to FIGS. 6A to 6D and 7.

Figure 6A:
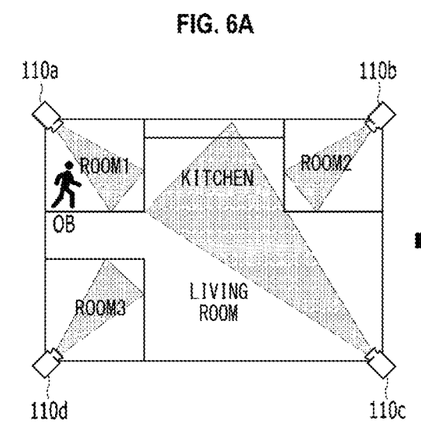
FIGS. 6A to 6D are diagrams for explaining an example of an operation of the surveillance camera system according to an embodiment of the present disclosure.
Figure 6B:
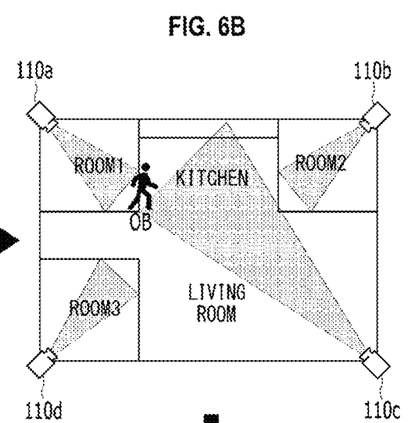
Figure 6C:
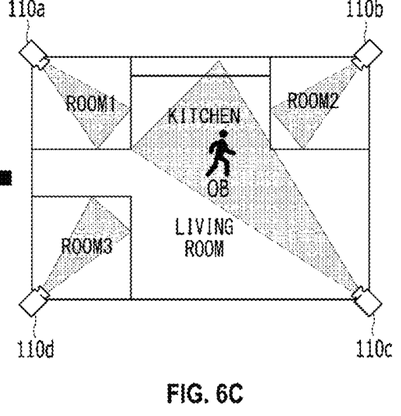
Figure 6D:
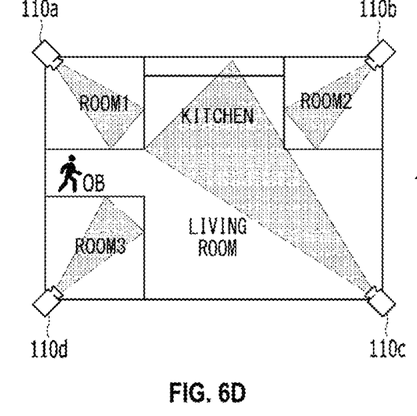
Figure 7:
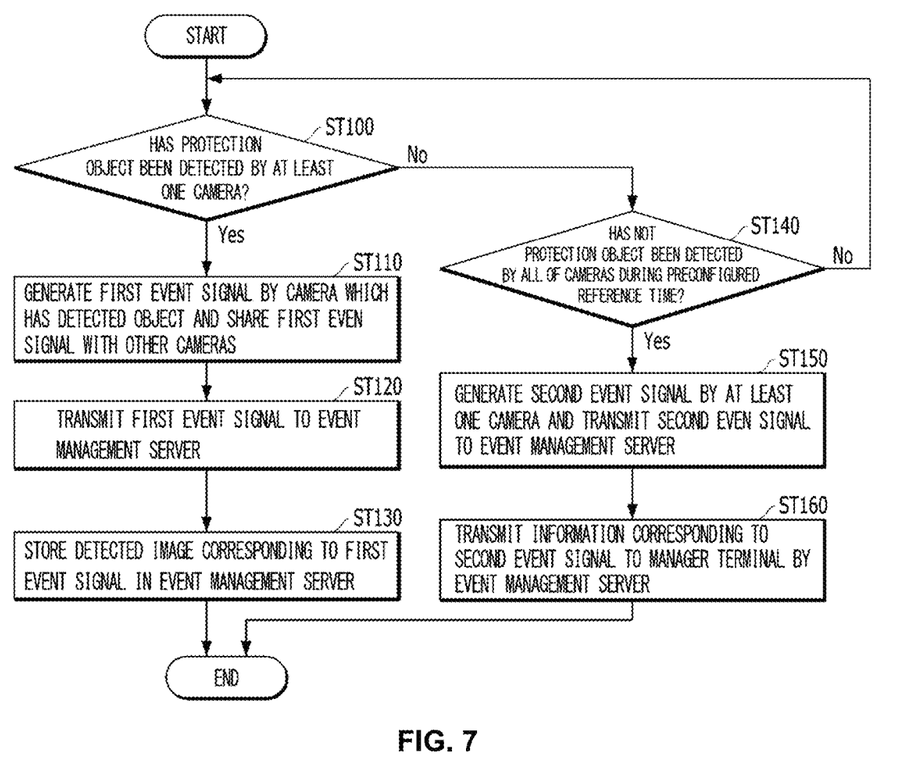
FIG. 7 is a flowchart illustrating a method for operating the surveillance camera system according to an embodiment of the present disclosure.

FIGS. 6A to 6D are diagrams for explaining an example of the operation of the surveillance camera system according to the embodiment of the present disclosure, and FIG. 7 is a flowchart illustrating an operation method of the surveillance camera system according to the embodiment of the present disclosure.

In an embodiment of the present disclosure, in the surveillance camera system in which at least two or more cameras operate in conjunction with each other, the surveillance system recognizes a case where each of the two or more cameras does not detect the protection object which is the object to be monitored during the preconfigured reference time as a specific event and transmits event information corresponding to the event signal (second event signal) to an external manager terminal to prevent accidents that may occur in a blind spot of the surveillance region in advance.

In the case of an embodiment of the present disclosure, the event signal may include a first event signal generated when the protection object is detected by at least one of a plurality of cameras and a second event signal generated when the protection object is not detected by all the cameras during a preconfigured reference time.

Therefore, in an embodiment of the present disclosure, first, in the plurality of surveillance cameras responsible for each surveillance region, that is, the first to fourth cameras 100a, 100b, 100c, and 100d, a step of confirming whether the protection object OB has been detected by at least one camera of the first to fourth cameras 100a, 100b, 100c, and 100d is performed (ST100).

In this case, when the protection object is detected by at least one camera, a first event mode may be operated in which the first event signal is generated and the event information corresponding the first even signal is provided (ST110 to ST130). In addition, when the protection object is not detected by all of the cameras during the preconfigured reference time, a second event mode may be operated in which the second event signal is generated and the event information corresponding to the second event signal is provided (ST140 to ST160).

First, the operation of the first event mode will be described with reference to the embodiment illustrated in FIGS. 6A and 6C.

Referring to the embodiment illustrated in FIGS. 6A to 6D, the first camera 100a may serve as a camera which is installed in a room 1 to monitor a space (first surveillance region) of the room 1, the second camera 100b may serve as a camera which is installed in a room 2 to monitor a space (second surveillance region) of the room 2, the third camera 100c may serve as a camera which is installed in a living room to monitor a space (third surveillance region) of the living room, and the fourth camera 100d may serve as a camera which is installed in a room 3 to monitor a space (fourth surveillance region) of the room 3.

For example, as illustrated in FIG. 6A, when the protection object OB is detected by the first camera 100a in the first surveillance region, the first camera 100a that has detected the protection object generates the corresponding first event signal and shares the first event signal with other cameras (ST110). More specifically, when the protection object OB is detected in the first surveillance region by the first camera, the detected result is transmitted (broadcast) to other cameras, that is, the second to fourth cameras 100b, 100c, and 100d, and thus, the location and state of the protection object OB may be shared. In this case, the detection result of the first camera may be information corresponding to the first event signal.

In addition, the first camera 100*a* generating the first event signal may transmit the first event signal, that is, the first event signal corresponding to the protection object OB detected in the first surveillance region to the event management server 300 (ST120), and thus, the event management server 300 may store information corresponding to the first event signal corresponding to the protection object OB detected in the first surveillance region, that is, an image signal obtained by capturing the image of the protection object, an audio signal recorded in the first surveillance region at the time of photographing, and/or a location signal (for example, a GPS signal or the like) of a photographing place (ST130).

Similarly, as illustrated in FIG. 6C, when the protection object OB is detected by the third camera 100*c* in the third surveillance region, the third camera 100*c* that has detected the protection object generates the corresponding first event signal and shares the first event signal with other cameras (ST110). More specifically, when the protection object OB is detected in the third surveillance region by the third camera, the detected result is transmitted (broadcast) to other cameras, that is, the first, second, and fourth cameras 100*a*, 100*b*, and 100*d*, and thus, the location and state of the protection object OB may be shared.

In addition, the third camera 100*c* generating the first event signal may transmit the first event signal, that is, the first event signal corresponding to the protection object OB detected in the third surveillance region to the event management server 300 (ST120), and thus, the event management server 300 may store information corresponding to the first event signal corresponding to the protection object OB detected in the third surveillance region, that is, an image signal obtained by capturing the image of the protection object, an audio signal recorded in the third surveillance region at the time of photographing, and/or a location signal (for example, a GPS signal or the like) of a photographing place (ST130).

In the operation of the surveillance system according to the embodiment of the present disclosure, in the case of the first event mode, as described above, the first event signal is generated by the camera which had detected the protection object and is shared with the other cameras. Moreover, the first event signal and/or the information corresponding thereto may be transmitted to the event management server 300 and stored therein. However, for the first event mode, the information corresponding to the first event signal may not be transmitted to the manager terminal 200 possessed by a guardian of the protection object.

However, when the first event signal meets the additional conditions (for example, detection of a specific dangerous behavioral pattern of the protection object, detection of a state that does not move during the preconfigured time, detection of a peculiar sound, or the like) set by the user, the information corresponding to the first event signal may be transmitted to the manager terminal 200, but in general, when it is detected that the protection object moves in a normal state, the first event signal corresponding to the case may not be transmitted to the manager terminal 200 separately.

Meanwhile, in the second event mode, that is, when each of all of the installed surveillance cameras does not detect the protection object which is the object to be monitored during the preconfigured reference time, the second event signal is generated, the second even signal is regarded as an event corresponding to a dangerous situation, the event information corresponding to the second event signal is transmitted to the manager terminal 200, and thus, accidents that may occur in the blind spot of the surveillance region is prevented in advance.

Referring to the embodiment of FIG. 6B, FIG. 6B illustrates a state where the protection object OB is not detected by the first camera 100*a* monitoring the first surveillance region and the third camera 100*c* monitoring the third surveillance region while the protection object OB moves from the first surveillance region (room 1) to the third surveillance region (living room). In this case, since the protection object cannot be detected not only by the first and third cameras, but also by the remaining second and fourth cameras, this case may correspond to the aforementioned second event mode.

However, in general, a period of non-detection by the surveillance camera generated when the protection object simply moves from a specific surveillance region to another surveillance region is smaller than the preconfigured reference time. That is, in general, the reference time is set to a period sufficient to infer that the protection object cannot be moved due to an abnormality, which may be preset by the manager.

For example, in a case where the reference time is set to ten minutes, when the time for the protection object OB to move from the first surveillance region (room 1) to the third surveillance region (living room) is three minutes, although the protection object is not detected by all cameras during the period of three minutes, the three minutes are within the preconfigured reference time, and thus, this case does not correspond to the second event mode in which the second event signal must be generated.

In contrast, referring to the embodiment of FIG. 6D, FIG. 6D illustrates a state where the protection object OB is collapsed in the space between the first surveillance region (room 1) and the fourth surveillance region (room 3) and cannot move. In this case, the protection object cannot be detected not only by the first and fourth cameras, but also by the remaining second and third cameras, and the above-described period during which the protection object is not detected by all the cameras exceeds the preconfigured reference time. Therefore, this case corresponds to the second event mode (ST140).

When it is determined that the case corresponds to the second event mode as described above, at least one of the first to fourth cameras 100*a*, 100*b*, 100*c*, and 100*d* generates the second event signal corresponding thereto, and the second event signal, that is, the second event signal corresponding to that all cameras 100*a*, 100*b*, 100*c*, and 100*d* do not detect the protection object OB may be transmitted to the event management server 300 (ST150).

In this case, the camera generating the second event signal may be set by the manager. For example, when the first camera 100*a* is set as the main camera, when the second event mode occurs, the first camera 100*a* may generate a second event signal. Moreover, when the first camera 100*a* generates the second event signal, the second event signal may be shared with other cameras. More specifically, when the protection object is not detected by all cameras for the preconfigured reference time, the result (corresponding to the second event signal) that the protection object is not detected by the first camera is transmitted (broadcast) to other cameras, that is, the second to fourth cameras (100*b*, 100*c*, and 100*d*), and thus, each of the above cameras may share in real time whether a protection object has been detected in the surveillance regions of the other cameras.

In the case of the second event mode, when the event management server 300 receives the second event signal from the first camera, the event management server 300 may recognize this as an event corresponding to a dangerous situation and transmit the event information corresponding to the second event signal to the manager terminal 200 (ST160).

The manager terminal 200 that has received the event information corresponding to the second event signal may generate and output a predetermined warning signal through the display module 230 and/or the audio output module 240 of the manager terminal 200 by the surveillance application 220a, and thus, it is possible to prevent accidents that may occur in the blind spot of the surveillance region in advance.

In addition, information corresponding to the second event signal, that is, an audio signal recorded during a period in which the protection object is not detected and/or a location signal (for example, GPS signal) of a place corresponding to the second event signal may be stored in the server memory 310 of the event management server 300.

As described above, in the present disclosure, specific matters such as specific components or the like and limited embodiments and drawings have been described, but these are only provided to help a more general understanding of the present disclosure, the present disclosure is not limited to the above embodiments, and various modifications and variations are possible from these descriptions by those of ordinary skill in the art to which the present disclosure pertains.

Therefore, the spirit of the present disclosure should not be limited to the described embodiments, and not only the claims to be described later, but also all equivalents or equivalent modifications to these claims shall fall within the scope of the spirit of the present disclosure.

What is claimed is:

1. A surveillance camera system comprising:
    a plurality of surveillance cameras configured to capture images of different surveillance regions to monitor a protection object;
    an event management server connected to the surveillance cameras through a communication network to receive a first event signal or a second event signal from at least one of the surveillance cameras; and
    a manager terminal configured to receive event information corresponding to the second event signal from the event management server when the second event signal is generated,
    wherein the first event signal is a signal generated when the protection object is detected by at least one surveillance camera of the plurality of surveillance cameras and the second event signal is a signal generated when the protection object is not detected by any of the plurality of surveillance cameras during a preconfigured reference time.

2. The surveillance camera system of claim 1, wherein the plurality of surveillance cameras includes a first camera to a fourth camera configured to monitor the different surveillance regions, and when the protection object is detected in the first surveillance region of the first camera, the first camera transmits the detection result to other cameras to share the detection result.

3. The surveillance camera system of claim 2, wherein the first camera which detects the protection object generates the first event signal to transmit the first event signal to the event management server.

4. The surveillance camera system of claim 3, wherein the event management server stores information corresponding to the first event signal by itself and does not transmit the stored information to the manager terminal.

5. The surveillance camera system of claim 4, wherein the information corresponding to the first event signal includes an image signal capturing the image of the protection object, an audio signal recorded when an image is captured by the first camera, and a location signal of a photographed place.

6. The surveillance camera system of claim 1, wherein when the protection object is not detected by any of the plurality of surveillance cameras during the preconfigured reference time, the second event signal is generated by at least one surveillance camera of the plurality of surveillance cameras.

7. The surveillance camera system of claim 6, wherein at least one surveillance camera generating the second event signal transmits the second event signal to the event management server.

8. The surveillance camera system of claim 7, wherein the event management server transmits information corresponding to the second event signal to the manager terminal.

9. The surveillance camera system of claim 8, wherein the information corresponding to the second event signal includes an audio signal recorded to cover a period in which the protection object is not detected and a location signal of a place corresponding to the second event signal.

10. The surveillance camera system of claim 8, wherein the manager terminal receiving event information corresponding to the second event signal generates and outputs a predetermined warning signal.

11. A method for operating a surveillance camera system to capture images of different surveillance regions through a plurality of surveillance cameras and monitor a protection object, the method comprising:
    determining whether the protection object is detected by at least one surveillance camera of the plurality of surveillance cameras;
    performing a first event mode in which a first event signal is generated when the protection object is detected by the at least one surveillance camera; and
    performing a second event mode in which a second event signal is generated when the protection object is not detected by any of the plurality of surveillance cameras during a preconfigured reference time.

12. The method of claim 11, wherein the plurality of surveillance cameras includes a first camera to a fourth camera configured to monitor the different surveillance regions, and
    the method further includes generating, when the protection object is detected in a first surveillance region of the first camera, a first event signal corresponding to the detection result by the first camera and transmitting the first event signal to other cameras to share.

13. The method of claim 11, further comprising:
    transmitting the first event signal to an event management server; and
    storing information corresponding to the first event signal by the event management server,
    wherein the stored information is not transmitted to the manager terminal.

14. The method of claim 13, wherein the information corresponding to the first event signal includes an image signal capturing the image of the protection object, an audio signal recorded when an image is captured by the first camera, and a location signal of a photographed place.

15. The method of claim 11, further comprising:
    generating the second event signal by at least one surveillance camera of the plurality of surveillance cameras when the protection object is not detected by any of the plurality of surveillance cameras during the preconfigured reference time; and transmitting the second event signal to an event management server by at least one surveillance camera generating the second event signal.

16. The method of claim 15, further comprising transmitting information corresponding to the second event signal to a manager terminal by the event management server.

17. The method of claim 16, wherein the information corresponding to the second event signal includes an audio signal recorded to cover a period in which the protection object is not detected and a location signal of a place corresponding to the second event signal.

18. The method of claim 17, further comprising generating and outputting a predetermined warning signal by the manager terminal receiving the event information corresponding to the second event signal.

19. A method for operating a surveillance camera system to capture images of different surveillance regions through a plurality of surveillance cameras and monitor a protection object, the method comprising:

determining whether the protection object is detected by at least one surveillance camera of the plurality of surveillance cameras;

performing a first event mode in which a first event signal is generated upon determination that the protection object is detected by the at least one surveillance camera; and performing a second event mode in which a second event signal is generated upon determination that a time period of non-detection of the protection object by any of the plurality of surveillance cameras is greater than a preconfigured reference time, wherein the information corresponding to the second event signal includes an audio signal recorded for the time period of non-detection of the protection object and a location signal of a place corresponding to the second event signal.

20. The method of claim 19, wherein the plurality of surveillance cameras comprises a first surveillance camera and a second surveillance camera, wherein the preconfigured reference time is greater than a period of non-detection by any of the surveillance cameras during the protection object simply moving from a first surveillance region monitored by a first surveillance camera to a second surveillance region monitored by a second surveillance camera.

\* \* \* \* \*